United States Patent [19]

Masuda

[11] Patent Number: 5,275,268
[45] Date of Patent: Jan. 4, 1994

[54] MULTIPLE DISC TYPE ENGAGING DEVICE

[75] Inventor: Yasuhiro Masuda, Shizuoka, Japan

[73] Assignee: Jatco Corporation, Fuji, Japan

[21] Appl. No.: 980,698

[22] Filed: Nov. 24, 1992

[51] Int. Cl.⁵ .................. F16D 47/04; F16D 25/0638
[52] U.S. Cl. ................ 192/48.92; 192/70.2; 192/85 AA
[58] Field of Search .......................................... 192/85

[56] References Cited

U.S. PATENT DOCUMENTS 2,670,828  3/1954  McFarland .............. 192/85 AA X
3,251,442  5/1966  Aschauer .............. 192/48.92 X

FOREIGN PATENT DOCUMENTS 1-206124  8/1989  Japan ............................ 192/85 AA
91/08399  6/1991  World Int. Prop. O. ..... 192/85 AA

OTHER PUBLICATIONS

Nissan Motor Co., Ltd, "Service Manual", vol. 599, May, 1988, p. C-12.

Primary Examiner—Richard M. Lorence
Attorney, Agent, or Firm—Foley & Lardner

[57] ABSTRACT

A multiple disc type engaging device which includes a rotatable member having a cylindrical outer surface and a hub with a cylindrical barrel portion coaxially arranged with respect to the cylindrical outer surface. The cylindrical barrel portion has at one end an annular flange which is bent radially inwardly toward the cylindrical outer surface. An outer surface of the cylindrical barrel portion is formed with a plurality of axially extending splines. Annular discs are coaxially disposed about the cylindrical barrel portion and have toothed inner ends axially movably engaged with the splines. A leading end portion of the annular flange is bent back into the interior of the barrel portion and secured to the cylindrical outer surface.

3 Claims, 1 Drawing Sheet

MULTIPLE DISC TYPE ENGAGING DEVICE

BACKGROUND OF THE INVENTION

1. Field of the Invention

The present invention relates to multiple disc type engaging devices, such as multiple disc clutches, multiple disc brakes and the like, installed in an automatic transmission.

2. Description of the Prior Art

In order to clarify the task of the present invention, one conventional multiple disc type engaging device will be described, which is shown in "SERVICE MANUAL" volume 599 issued May, 1988 from NISSAN MOTOR CO., LTD.

The device is a forward clutch of multiple disc type, which is partially shown in FIG. 3 of the accompanying drawings.

The forward clutch comprises a hub 01 which is constructed to have a cylindrical barrel portion 02. The barrel portion 02 has at its one end an annular flange 03 bent radially inwardly. An outer surface of the barrel portion 02 is formed with a plurality of axially extending splines 05 with which annular drive discs 04 are meshed. For this meshed engagement, each annular drive disc has a plurality of teeth. The annular flange 03 has a leading end portion 06 bent axially outwardly with respect to the barrel portion 02 and secured to an outer race 08 of a forward one-way clutch 07.

In order to increase the torque transmitting capacity of the forward clutch, the number of discs 04 is increased. Thus, in this case, the length of the barrel portion 02 should be increased. However, elongation of such barrel portion 02 is substantially impossible because of a limited space for the hub 01 in the transmission housing. Furthermore, if the length of the barrel portion 02 is increased, the axially extending part 06 of the annular flange 03 becomes short in length. This means a lowering of the connecting force with which the hub 01 is coupled with the outer race 08.

SUMMARY OF THE INVENTION

It is therefore an object of the present invention to provide a multiple disc type engaging device which is free of the above-mentioned drawbacks.

That is, the object of the present invention is to provide a multiple disc type engaging device which has a satisfactory torque transmitting capacity without sacrificing the assured mechanical connection between the hub and the outer race.

According to a first aspect of the present invention, there is provided a multiple disc type engaging device which comprises a rotatable member having a cylindrical outer surface; a hub having a cylindrical barrel portion coaxially arranged with respect to the cylindrical outer surface, the cylindrical barrel portion having at one end an annular flange which is bent radially inwardly toward the cylindrical outer surface; means providing an outer surface of the cylindrical barrel portion with a plurality of axially extending splines; annular discs coaxially disposed about the cylindrical barrel portion and having toothed inner ends axially movably engaged with the splines, wherein a leading end portion of the annular flange is bent back into the interior of the barrel portion and secured to the cylindrical outer surface.

According to a second aspect of the present invention, there is provided a multiple disc clutch for use in an automatic transmission. The multiple disc clutch comprises a rotatable outer race; a hub having a cylindrical barrel portion coaxially arranged with respect to the outer race, the cylindrical barrel portion having at one end an annular flange which is bent radially inwardly toward the outer race, the barrel portion having at its outer surface a plurality of axially extending splines; annular drive discs coaxially disposed about the cylindrical barrel portion and having toothed inner ends axially movably engaged with the splines; a clutch drum coaxially arranged to receive therein the annular drive discs, the clutch drum having at its outer wall a plurality of axially extending splines; annular driven discs alternately juxtaposed with the annular drive discs and having outer toothed ends axially slidably engaged with the splines of the clutch drum; and a piston installed in the clutch drum to selectively establish engagement and disengagement between the drive discs and the driven discs, wherein a leading end portion of the annular flange is bent back into the interior of the barrel portion and secured to the outer race.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Figure 1:
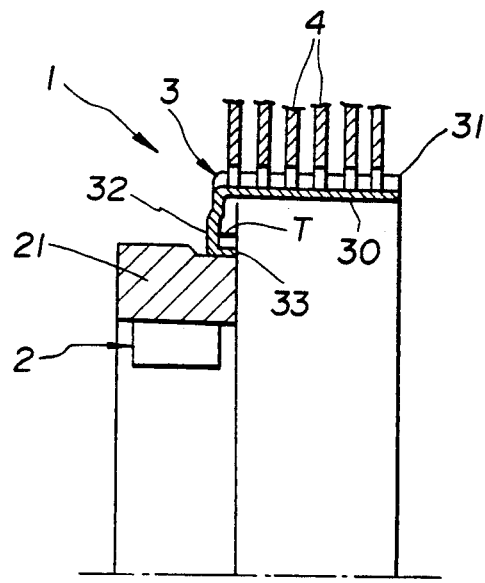
FIG. 1 is a sectional view of an essential part of a multiple disc clutch which is one embodiment of the present invention.
Figure 2:
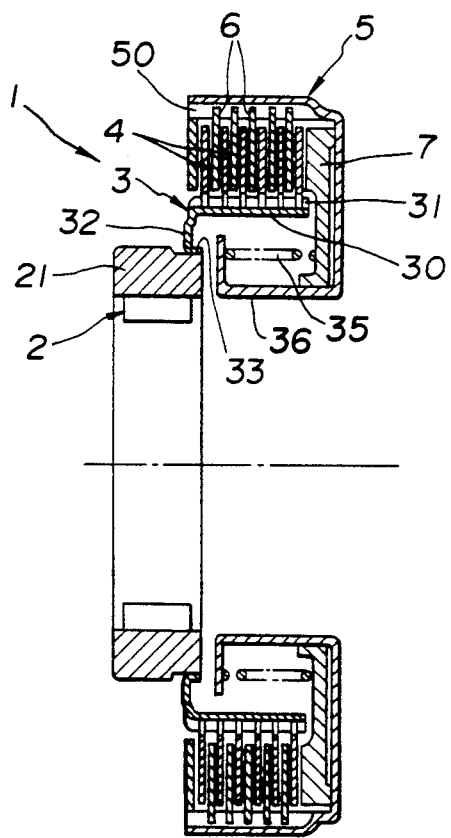
FIG. 2 is a sectional view of the multiple disc clutch of the embodiment.
Figure 3:
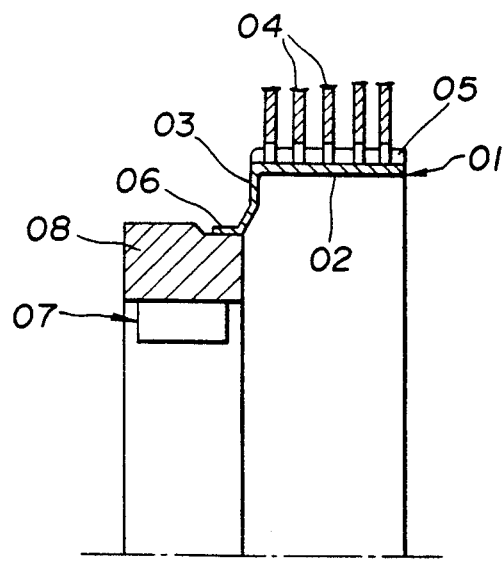
FIG. 3 is a view similar to FIG. 1, but showing a conventional multiple disc clutch.

Referring to FIGS. 1 and 2, there is shown a multiple disc clutch 1 which is an embodiment of the present invention.

As is understood from FIG. 1, the multiple disc clutch 1 of the invention comprises a hub 3 which is constructed to have a cylindrical barrel portion 30. The barrel portion 30 has at its one end an annular flange 32 bent radially inwardly. An outer surface of the barrel portion 30 is formed with a plurality of axially extending splines 31 with which annular drive discs 4 are meshed. For this meshed engagement, each annular drive disc has a plurality of teeth.

In accordance with the present invention, the following measure is employed.

That is, as is seen from FIG. 1, the radially inwardly bent annular flange 32 of the barrel portion 30 has a leading end portion 33 bent axially inward with respect to the barrel portion 30. That is, the annular flange 32 is turned back into the barrel portion 30.

The turned back portion 33 of the annular flange 32 is welded to an outer race 21 of a forward one-way clutch 2. It is to be noted that the reference "T" in FIG. 1 denotes the axial length of the turned back portion 33.

In FIG. 2, there are shown several parts which are associated with the annular drive discs 4 on the barrel portion 30. Designated by numeral 5 is a clutch drum which is coaxially arranged to receive therein the annular drive discs 4. An outer wall of the clutch drum 5 is formed at its inner surface with a plurality of axially extending splines with which a plurality of driven discs 6 alternately juxtaposed with the above-mentioned driven plates 4 are meshed. For the meshed engagement between the splines of the clutch drum 5 and the annular driven discs 6, each driven disc 6 is formed with a plurality of teeth. Designated by numeral 7 is a clutch piston which is installed in the clutch drum 5. In response to axial movement of the clutch piston 7 in the clutch drum 5, engagement and disengagement between the drive discs 4 and the driven discs 6 are selectively carried out.

A return spring 35 is incorporated with the piston 7 to bias the piston 7 in a direction to establish the disengagement between the drive discs 4 and the driven discs 6. The clutch drum 5 includes an inner wall 36 integral with the outer wall. The inner wall 36 has a diameter substantially equal to the inner diameter of the outer race 21. The inner wall 36 extends substantially in parallel with the cylindrical barrel portion 30 of the hub 3 in a manner to leave therebetween a space within which the return spring 35 is located. The piston 7, return spring 35, and annular flange 32 of the hub 3 are aligned along the axis of the clutch drum 5. The end of the inner wall 36 is bent radially outward to constitute a spring seat for the return spring 35.

As will be understood from the foregoing description, in accordance with the present invention, the length of the barrel portion 30 can be increased by an amount corresponding to the length "T" of the turned back portion 33 of the annular flange 32. This makes possible an increase in number of the drive and driven discs 4 and 6 on and around the barrel portion 30. Thus, the multiple disc clutch 1 of the invention can have a satisfactory torque transmitting capacity without sacrificing the mechanical connection between the hub 3 and the outer race 21.

Although the above description is directed to the multiple disc clutch 1, the concept of the present invention is not limited to such a clutch. Of course, the concept of the invention is applicable to a multiple disc brake of an automatic transmission or the like.

What is claimed is:

1. In an automatic transmission, a combination comprising:
   a one-way clutch having an outer race; and
   a multiple disc clutch including:
      a hub having a cylindrical barrel portion coaxially arranged with respect to said outer race, said cylindrical barrel portion having at one end an annular flange which is bent radially inwardly toward said outer race, said barrel portion having at its outer surface a plurality of axially extending splines;
      annular drive discs coaxially disposed about said cylindrical barrel portion and having toothed inner ends axially movably engaged with said splines;
      a clutch drum coaxially arranged with respect to said outer race and receiving therein said annular drive discs, said clutch drum having at an inner surface of an outer wall a plurality of axially extending splines;
      annular driven discs alternately juxtaposed with said annular drive discs and having outer toothed ends axially slidably engaged with said splines of said clutch drum; and
      a piston operatively installed in said clutch drum to selectively established engagement and disengagement between said drive discs and said driven discs;
   wherein an end portion of said outer race of said oneway clutch is received in said cylindrical barrel portion, and a leading end portion of said annular flange is bent back into an interior of said barrel portion and secured to said end portion of said outer race.

2. The combination of claim 1, further comprising a return spring incorporated with said piston to bias the piston in a direction to establish the disengagement between said drive discs and said driven discs, and wherein said clutch drum further comprises an inner wall integral with said outer wall, said inner wall having a diameter substantially equal to the inner diameter of said outer race and extending substantially in parallel with the cylindrical barrel portion of said hub in a manner to leave therebetween a space within which said return spring is located, and in which said piston, said return spring and said annular flange of said hub are aligned along the axis of said clutch drum.

3. The combination of claim 2 wherein an end of said inner wall of said clutch drum is bent radially outward to constitute a spring seat for said return spring.

* * * * *